United States Patent
Peters

(10) Patent No.: US 11,383,253 B2
(45) Date of Patent: Jul. 12, 2022

(54) LOW PRESSURE PLURAL COMPONENT SPRAY SYSTEM

(71) Applicant: Thomas Joseph Peters, Greensboro, GA (US)

(72) Inventor: Thomas Joseph Peters, Greensboro, GA (US)

(*) Notice: Subject to any disclaimer, the term of this patent is extended or adjusted under 35 U.S.C. 154(b) by 310 days.

(21) Appl. No.: 15/729,755

(22) Filed: Oct. 11, 2017

(65) Prior Publication Data

US 2018/0104709 A1    Apr. 19, 2018

Related U.S. Application Data

(60) Provisional application No. 62/407,730, filed on Oct. 13, 2016.

(51) Int. Cl.
*B05B 7/04* (2006.01)
*B05B 7/16* (2006.01)
(Continued)

(52) U.S. Cl.
CPC .......... *B05B 7/0416* (2013.01); *B05B 7/0037* (2013.01); *B05B 7/0043* (2013.01); *B05B 7/0408* (2013.01); *B05B 7/0483* (2013.01); *B05B 7/16* (2013.01); *B05B 12/0026* (2018.08); *B05D 1/02* (2013.01); *C08J 9/122* (2013.01); *C08J 9/30* (2013.01); *E04B 1/76* (2013.01);
(Continued)

(58) Field of Classification Search
CPC ............................ B05B 7/0031; B05B 7/0043
See application file for complete search history.

(56) References Cited

U.S. PATENT DOCUMENTS 4,060,572 A * 11/1977 Widmann ............. B29B 7/7409
                                                         261/18.1
4,169,545 A * 10/1979 Decker ................. B05B 7/0408
                                                         222/136
(Continued)

OTHER PUBLICATIONS

New Nordson EFD Static Mixer Optimizes Mix performance in a Significantly Shorter Length; website: https://www.nordson.com/en/divisions/efd/about-us/news/new-nordson-efd-static-mixer-optimizes-mix-performance-3-8-16, Mar. 8, 2016, downloaded Jan. 13, 2021.

(Continued)

*Primary Examiner* — Michael P. Rodriguez
(74) *Attorney, Agent, or Firm* — Thomas | Horstemeyer, LLP

(57) ABSTRACT

A method and apparatus for applying a foamed mixture of paints on a structural surface. A continuous stream of high velocity gas moves through a nozzle and is directed toward the structural surface, and two or more paints may be intermittently moved into the gas stream of the nozzle and aerated and mixed with each other and moved with the gas stream to form a foam that is applied to the structural surface. The components of the foamed mixture may include single component or plural component materials such as polyurethane foam, adhesive, and polyurea formulations, and may be moved through a volumetric metering device consisting of material heaters, a heated hose, and an applicator gun. The nitrogen gas stream fluidizes the mixture as it passes through and out of the nozzle and forms the mixture into a foam that is applied to the structural surface.

23 Claims, 5 Drawing Sheets

(51) Int. Cl.
  *E04B 1/76* (2006.01)
  *B05D 1/02* (2006.01)
  *B05B 7/00* (2006.01)
  *C08J 9/12* (2006.01)
  *C08J 9/30* (2006.01)
  *B05B 12/00* (2018.01)
  *B05D 1/34* (2006.01)

(52) U.S. Cl.
  CPC .............. *B05B 7/1693* (2013.01); *B05D 1/34* (2013.01); *C08J 2201/022* (2013.01); *C08J 2203/06* (2013.01); *C08J 2207/04* (2013.01); *C08J 2375/04* (2013.01)

(56) References Cited

U.S. PATENT DOCUMENTS

| | | | |
|---|---|---|---|
| 5,529,245 A | 6/1996 | Brown | |
| 5,893,486 A * | 4/1999 | Wasmire | B05C 17/00553 222/190 |
| 6,527,203 B2 | 3/2003 | Hurray | |
| 6,533,189 B2 | 3/2003 | Kott | |
| 7,717,357 B2 | 5/2010 | Gantenbein | |
| 2005/0023296 A1 * | 2/2005 | Bien | B05B 7/166 222/146.1 |
| 2005/0035220 A1 * | 2/2005 | Brown | B29B 7/7438 239/432 |
| 2006/0022067 A1 * | 2/2006 | Bhatia | B05B 7/2472 239/302 |
| 2014/0166775 A1 * | 6/2014 | Courier | B05B 7/26 239/73 |
| 2015/0360853 A1 * | 12/2015 | Nicmanis | B65D 83/753 516/10 |
| 2016/0044909 A1 * | 2/2016 | Lampe | B05B 12/002 47/1.5 |
| 2016/0184847 A1 | 6/2016 | Hummerlund | |

OTHER PUBLICATIONS

Nordson Catalog—2K Product Catalog—Third Edition, issued Oct. 26, 2013.
Google search showing the Emipirefoam catalog was available before Oct. 2016; search performed Jan. 13, 2021.

* cited by examiner

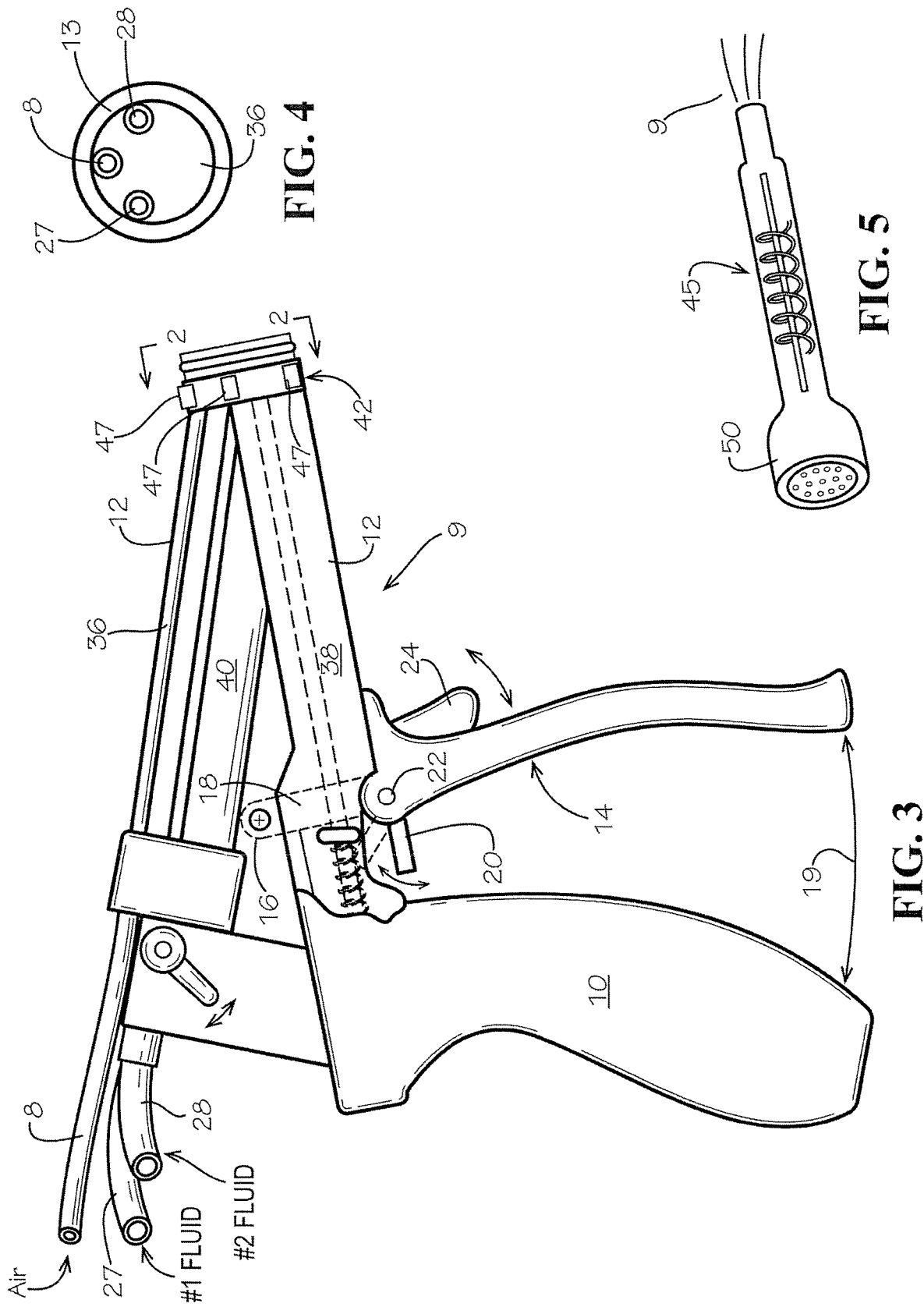

LOW PRESSURE PLURAL COMPONENT SPRAY SYSTEM

CROSS REFERENCE TO RELATED APPLICATIONS

This application claims priority with respect to U.S. provisional patent application Ser. No. 62/407,730, filed in the U. S. Patent and Trademark Office on Oct. 13, 2016.

BACKGROUND OF THE INVENTION

This invention concerns the process and apparatus for applying foam insulation to building surfaces for insulating the buildings from heat transfer.

For many years fiberglass has been used as heat insulation on surfaces of building structures that are exposed to the atmosphere. Typically, fiberglass is manually applied to walls, ceilings, floors, roofs, air ducts, pipes and other surfaces to avoid transfer of heat. Spray foam, sometimes referred to as "SPF", usually is a polyurethane foam and has become an alternative to traditional building insulation such as fiberglass. SPF usually comprises a liquid mixture of isocyanate and polyol resin. The liquid components are moved under pressure to come together at the tip of a spray gun where a stream of high velocity gas forms the components in an expanding foam that is sprayed onto the structural surfaces as described above, as well as roof tiles, concrete slabs, wall cavities, and through drilled holes in a cavity of a finished wall. The SPF technology is relatively new to the construction industry.

Various systems have been developed that used high pressure equipment to apply a two component spray foam to structural surfaces. The chemical components react once they have been mixed together and that have been applied to the structural surface of a building. They expand in a few seconds into a closed cell foam clinging to the structural surface. The two component low pressure spray foam system may be used for remodel jobs and it usually is a slow rise formulation injection foam.

There are multiple types of SPF. The most commonly used are light-density open-cell and medium-density closed-cell spray foam. Both types are thermoset cellular plastics usually comprising millions of small cells. Foam insulation blocks all three types of heat transfer: conductive, radiant and convective. SPFs are great energy savers as well as being moisture resistant, mold resistant and noise reducing. SPF insulation can often times be eligible for state and federal energy saving tax deductions.

SPF is also used worldwide in industrial markets for applications such as RV manufacturing, boat manufacturing, mobile home manufacturing, and other types of industrial manufacturing applications where adhesives, sealants, and insulations are used. In addition, SPF is used for geotechnical applications such as void fill and lifting and leveling of surfaces that have sunk due to unstable soils.

Polyurea is a plural component chemistry that is created in a very similar method to that of spray polyurethane foam. Two chemicals (A & B) are mixed together usually at a proper ratio of about 1:1 and sprayed out to form an instant fast set coating that is used in many different types of applications. Some of the applications include secondary containment in oil fields, roof coatings, truck bed liners, chemical resistant waterproofing, on site lining creation for fracking, waterproofing in pond liners, swimming pool liners, and many other types of applications that may require a seamless, flexible coating that can withstand UV light over time. Probably, the most well-known type of polyurea is a truck bed liner.

Traditional prior art plural component spray systems used for spraying polyurethane or other plural component chemicals generally are complex, large pieces of equipment that require high pressure impingement mixing in order to properly mix chemicals and to achieve adequate mixing and quality finished products. High pressure spray systems typically store products in fifty-five gallon drums and utilize transfer pumps to feed high pressure proportioning systems that then mix the chemicals at high pressures through impingement mixing nozzles incorporated in a spray gun used for product delivery. This prior art system may be a hazardous delivery system and requires considerable training to operate and maintain.

Low pressure foam systems are chemicals that are usually mixed at 300 pounds per square inch or less. The materials are stored in pressure vessels and compressed with nitrogen in order to propel the chemicals through the lines. Material delivery options available today are limited in that equipment that can accommodate low pressure spray processing in drums, totes, or other non-pressurized cylinders apparently are not currently available in the marketplace.

It appears that prior art low-pressure spraying of high-pressure plural component system products was not practically achievable.

Prior to the development of this inventor's low pressure foam spray system identified by the trademark Nitrosys™, it appears that other systems in the marketplace required "manual calibration" and usually consisted of systems capable of heating the material with a heated hose. The prior art applicator would attach a set of plural component heated hoses directly to the A and the B tank and would pressurize the tanks with nitrogen using a regulator for each tank. After the tanks were pressurized, the applicator would take a sample spray of each material A and B simultaneously in order to get a weight of the A and B material. Upon weighing the A and B material, the user would be required to determine the ratio of the material and make adjustments to the Nitrogen pressure in the A and B tanks to either increase or decrease tank head pressures in order to increase or decrease flow volume of the A and/or B material.

It appears that low pressure refillable formulations require users to process A and B materials at a temperature at or around 80 degrees F. in order for the chemical reaction to occur properly. If material temperatures were not preheated to these temperatures and the temperatures maintained for the length of the hose leading from the supply to the nozzle, the material would cool off and would not react properly.

Advantages

Because of the simplicity and smaller size and weight of the invention as disclosed herein, the process of applying spray foam on structural surfaces and elsewhere will allow the average construction worker to work in the plural component spray polyurethane business market.

Advantages of the invention disclosed herein as compared to the prior art include:
 1. On Ratio Mixing
 2. Preheated materials allows spraying in winter time
 3. Reduced labor costs due less time spent calibrating
 4. Reduced chemical costs due to on ratio materials and less waste due to no calibrations required
 5. Low power requirements of 120V 6. Safer for applicators and building owners due to less likelihood of human exposure
7. Less startup time
8. Use of air as a mixing agent is safe and inexpensive.

Other advantages of the invention as disclosed herein are believed to include:

1. Simplicity and cost of application equipment
2. Reduced operating expense
3, Reduced overhead
4. Less training than with traditionally available systems
5. Safe operation
6. Reduced chemical atomization resulting in less worker exposure to chemicals during application
7. Up to 24× faster re occupancy times than traditional systems
8. Reduced downtime
9. Much smaller equipment footprint

BRIEF DESCRIPTION OF THE DRAWINGS

FIG. 3 is a side view of the spray gun with parts removed to illustrate functions of the gun.

FIG. 4 is an end view of the support barrel, taken along arrows 2-2 of FIG. 3, showing the support disk and the ends of the gas and paint conduits that extend through the support disk.

FIG. 5 is a perspective view of the assembled nozzle that fits onto the end of the support barrel.

DETAILED DESCRIPTION

Figure 1:
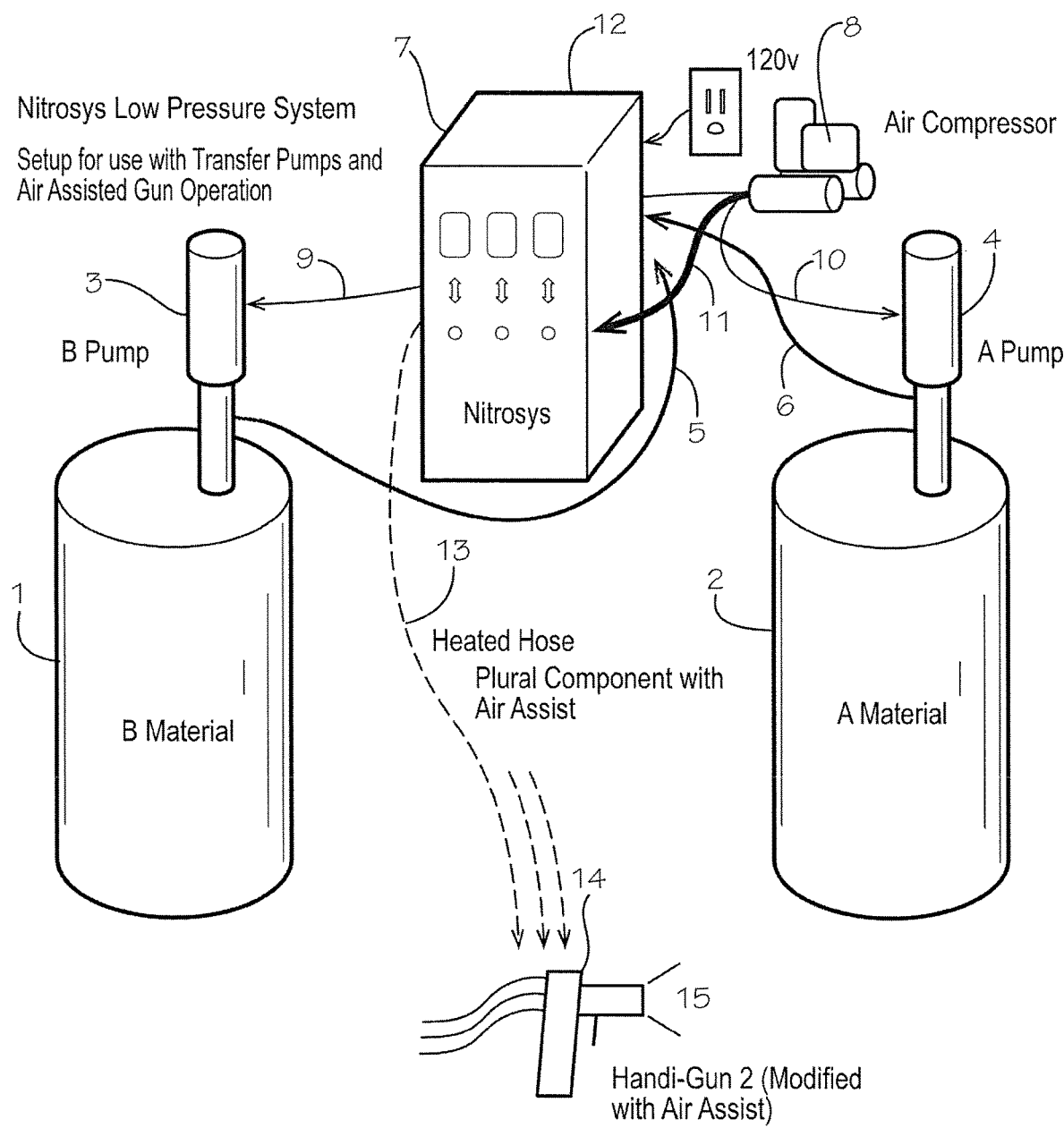
FIG. 1 is a schematic illustration of a setup of equipment for using the hand held applicator "gun" that mixes and urges the gas and paints to form the foam that is to be applied to a building structure.

Referring now in more detail to the drawings in which like numerals indicate like parts throughout the several views, FIG. 1 is an illustration of the arrangement of the components that supply the liquid paint and gas to the applicator gun.

One of the liquid paint materials is stored in container A which is a non-pressurized container, which may be a 5, 15, 55, or 250 gallon drum or tote. Likewise, another liquid paint material is stored in a non-pressurized container B of the same capacities in a drum or tote. Transfer pumps 3 and 4 are applied to both containers of the A and B materials for urging these liquid materials through separate conduits to the Nitrosys low pressure proportioner, which then sends the materials through a heated hose to the hand-held applicator gun 15. The Nitrosys device may include electronically controlled pre-heaters, volumetric metering devices, electronically controlled heated hose, stroke counter, pump louve system, and may be powered by 120 volt power and metering device, as is necessary to transmit the paints and air to the applicator gun at the correct ratio, temperature and flow rate.

Figure 2:
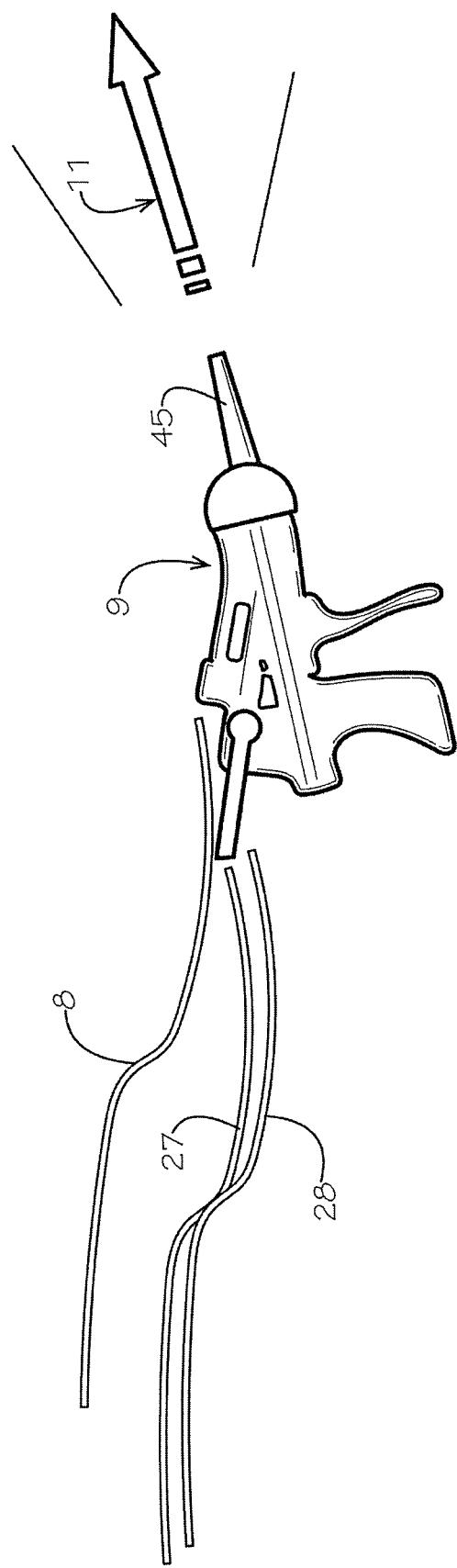
FIG. 2 is a side view of the hand held spray gun that mixes and applies the foam.

FIG. 2 is a closer view of the applicator gun, showing the three conduits leading to it. One conduit 8 is for the application of gas, such as nitrogen or air and two lines 27 and 28 are for the application of paints, with the resulting mixture of foam material illustrated in FIG. 2 as moving out of the spout 45 of the gun.

FIG. 3 shows the spray gun in more detail, with parts shown in cross section to illustrate the internal components thereof.

As shown in FIG. 3, spray gun 9 includes a handle 10 and a support barrel 12 that extends approximately at a right angle from the handle.

A hand lever 14 is pivotally mounted to the support barrel 12 at pivot pin 16 so that the hand lever 14 moves in a large diameter arc around the lever pivot pin 16 as shown by dash line 19. Trigger 24 is pivotally mounted to the hand lever by pivot pin 22, and lock latch 20 is rigidly mounted to trigger 24 and pivots in response to the movements of the trigger about pivot pin 22 between the solid line and dash line positions. When the trigger 24 is pressed inwardly toward the hand lever 14, the lock latch 20 pivots about the pivot pin 22 and moves out of alignment with the handle and allows the hand lever to move toward engagement with the handle 10. This movement of the hand lever allows paints to move under pressure through the conduits of the spray gun. However, if trigger 24 is not pressed by the operator and the operator tries to close the hand lever, the lock latch 20 engages against the facing surface of the handle 10 so as to prevent the movement of the trigger.

As shown in FIG. 3, the three conduits 8, 27 and 28 that extend from the compressed gas and paint sources extend through the support pipes 36 and 40 of the spray gun 9 and to its nozzle 45 that is applied to the end of the barrel 12. As shown in more detail in FIGS. 6 and 7, air hose 8 and paint hoses 27 and 28 extend through pipe support disk 36 toward the nozzle 45. As described before, air pressure hose 8 extends through the air hose support conduit 36 while the fluids, such as the paints, extend through the paint hose support conduit 40. All of the hoses 8, 27 and 28 extend longitudinally through the support barrel toward the nozzle at the distal end of the support barrel 12, extending through support ring 36 at the delivery end of the support barrel 12.

Figure 6:
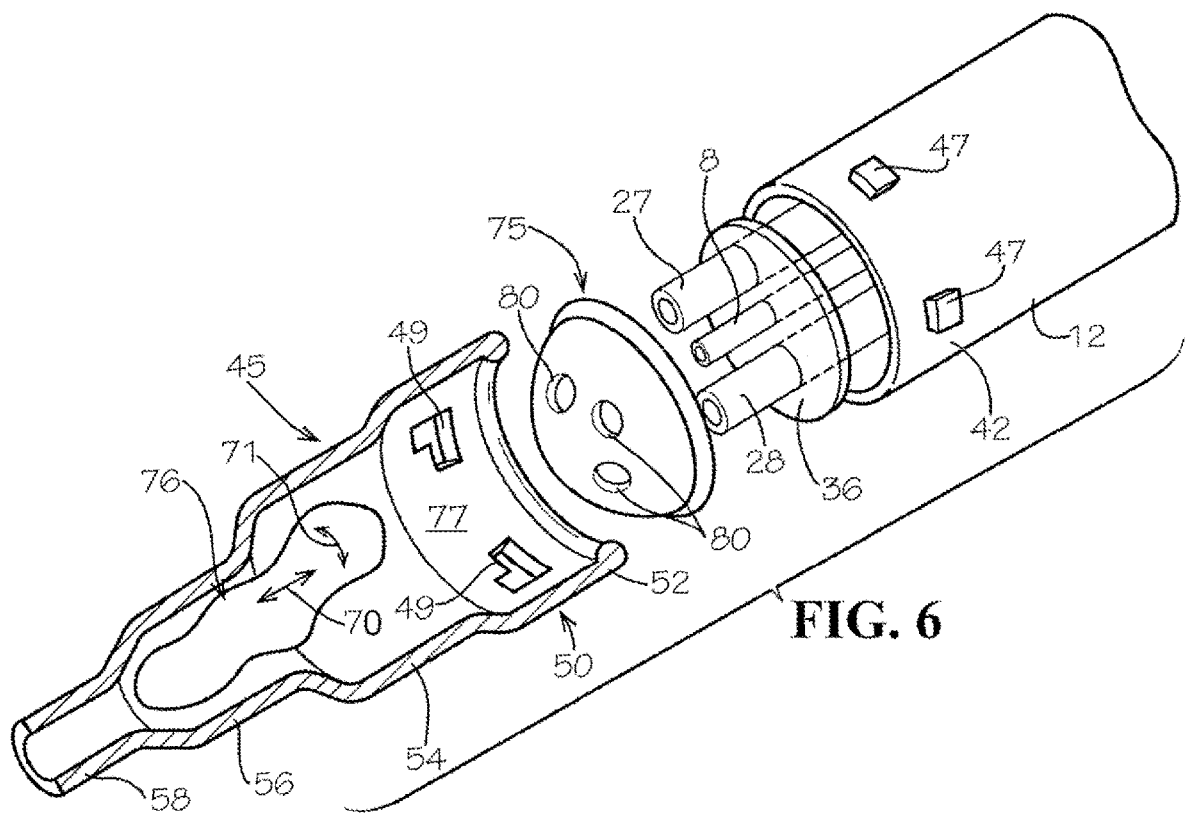
FIG. 6 is an expanded perspective view showing the end of the support barrel, its conduits and conduit support disks, the convex sieve, and the nozzle end with the free flowing diverter in the extended nozzle.

As shown in FIGS. 5 and 6, the nozzle 45 includes a cylindrical mounting collar 50 that connects to the exterior surface of the support barrel 12. The collar is enlarged and telescopically fits about the exterior of the support barrel 12. The nozzle 45 extends away from its mounting collar 50 and is of first reduced diameter at intermediate tube 54, second reduced diameter at projection tube 56, and ultimately at the smaller third reduced diameter exit spout 58.

A flow diverter 76 is positioned interiorly of the nozzle 45 and is of an irregular external shape, somewhat spiral and elongated to the extent that it can spin and otherwise move loosely within the nozzle 45, can move longitudinally and twist circumferentially as indicated by the arrows 70 and 71 of FIG. 6.

Figure 7:
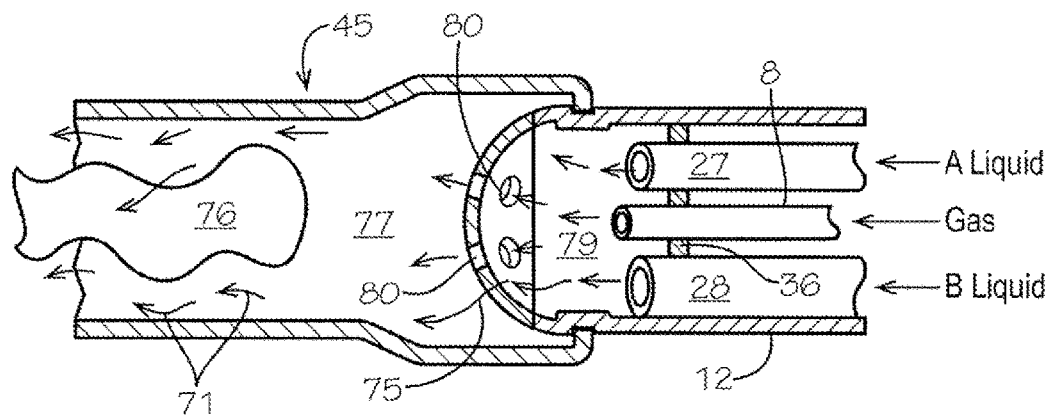
FIG. 7 is a side cross section of the portion of the assembled nozzle extending away from the support barrel.

A sieve 75 includes a perimeter mounting rim that is mounted on the open end of the support barrel 12. As shown in FIG. 7, the sieve 75 is concave and has a plurality of openings 80 formed there through for the passage of paint and gas delivered by conduits 8, 27, and 28. The sieve 75 directs the paints and air into a focal point at the end of the sieve 75 creating an air nucleated impingement mixing method that starts the chemical reaction process.

The free flowing diverter 76 is of irregular shape and moves in random turns within the smaller portions of the nozzle 45, as indicated at 71 in FIGS. 6 and 7, causing random turbulence within the nozzle 45, indicated by the arrows in FIGS. 6 and 7. This usually forms a churning pocket 77 downstream from the concave sieve 75 so that the required movements of paint and gas moving through the sieve and then through the churning pocket 77 and finally about the free flowing diverter 76 to the exit spout 58 requires a thorough mixing of the churning liquids to be delivered through the exit spout.

Further, there is an intermediate space 79 shown in FIG. 7 between the ends of the air hose and paint hoses 26-28, where mixing of the gas and paint begins at the sieve 75. The straining of the gas and paint through the sieve openings and the turbulence of the gas and paint leaving the sieve creates preliminary mixing of the gas and liquid paint even before they enter the churning pocket 77, and then being required to move about the free flowing diverter 76 and then out of the exit spout 58. This requires a significant amount of churning of the paints and gas and of different pressures within the delivery end of the device, particularly through the sieve, nozzle, and the free flowing diverter.

Figure 8:
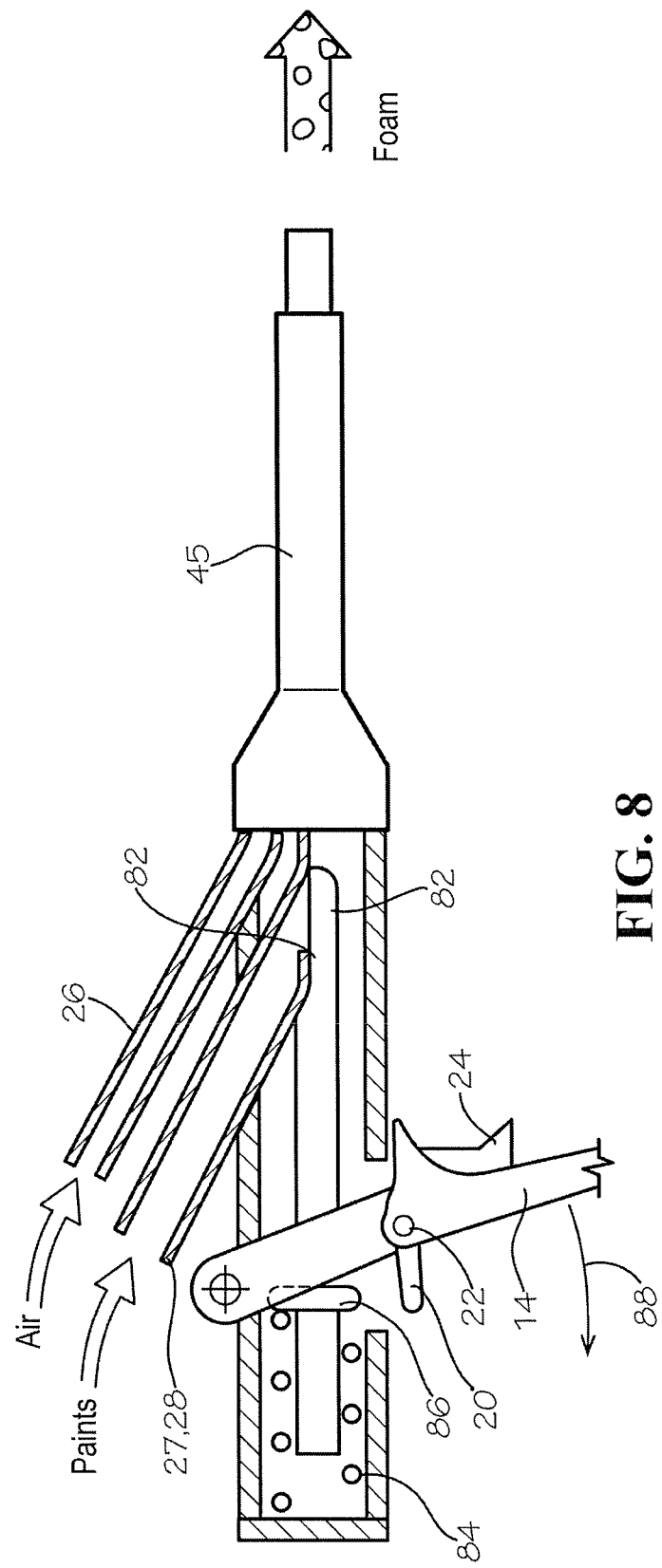
FIG. 8 is a partial cross section of the barrel and valve that controls the flow of paints through the gun.

FIG. 8 illustrates the valves that operate in response to the movements of the hand lever 14. A valve plunger 82 is biased by coil compression spring 84 toward the closed position of the valve plunger. The valve plunger blocks the paint hoses 27 and 28, while the air hose remains unblocked and moves continuously into the nozzle 45, as previously described. The coil compression spring 84 engages the compression ring 86 mounted on the valve plunger 82, and the coil compression spring engages and urges the valve 82 into its closed position, as illustrated. When the hand lever is tilted in the direction as indicated by arrow 88, the hand lever pushes the valve away from the paint hoses, allowing paints to move through their hoses in response to the pressure applied in the original containers of the paints. In the meantime, the air hose 26 remains open so that gas continuously moves into and through the nozzle 45. The components of the foamed mixture may include single component or plural component materials such as polyurethane foam, adhesive, and polyurea formulations, and may be moved through a volumetric metering device consisting of material heaters, a heated hose, and an applicator gun. The nitrogen gas stream fluidizes the mixture as it passes through and out of the nozzle and forms the mixture into a foam that is applied to the structural surface.

Although a preferred embodiment of the invention has been disclosed in detail herein, variations and modifications of the disclosed invention may be made without departing from the spirit and scope of the invention as set forth in the following claims.

The invention claimed is:

1. A low-pressure system for mixing plural foam components and applying a directed stream of the mixed plural foam components to a surface, comprising:
 a hand held applicator configured for mixing plural foam components and directing a stream of the mixed plural foam components to a surface, wherein the hand held applicator comprises:
  a barrel;
  a handle mounted to the barrel;
  a mixing nozzle mounted to the barrel;
  a sieve mounted to said barrel in alignment with the mixing nozzle;
  a flow diverter having a spiral and elongated diverter body positioned within the nozzle downstream from the sieve;
  a pair of fluid conduits extending through the barrel in alignment with the sieve and directed toward the mixing nozzle;
  a fluid volume control trigger mounted to said barrel for simultaneously opening and closing the fluid conduits; and
  a gas conduit extending toward the sieve configured for continuously providing gas to the sieve and mixing nozzle;
 a volumetric metering device in fluidic communication with the hand held applicator through a heated hose; and
 pre-heaters configured to heat plural foam components in the pair of fluid conduits, wherein the low-pressure system is configured to be operated at 300 pounds per square inch or less.

2. The system of claim 1, wherein the hand held applicator is configured for gas nucleated impingement mixing of the plural foam components from the pair of fluid conduits in the mixing nozzle upon actuation of the fluid volume trigger.

3. The system of claim 1, wherein the sieve of the hand held applicator has a first opening configured to receive gas from the gas conduit, a second opening configured to receive a first plural foam component from one conduit of the pair of fluid conduits, and a third opening configured to receive a second plural foam component from the second conduit of the pair of fluid conduits.

4. The system of claim 1, further comprising:
 an air compressor.

5. The system of claim 1, further comprising:
 a first non-pressurized container in fluidic communication with the volumetric metering device through a first conduit; and
 a second non-pressurized container in fluidic communication with the volumetric metering device through a second conduit.

6. The system of claim 5, further comprising:
 a first transfer pump configured to pump the first plural foam component from the first non-pressurized container though the first conduit to the volumetric metering device; and
 a second transfer pump configured to pump the second plural foam component from the second non-pressurized container through the second conduit to the volumetric metering device.

7. The system of claim 1, wherein the plural foam components comprise one or more of plural component polyurethane, polyurethane foam, polyurethane adhesive, and polyurea formulations.

8. The system of claim 1, wherein the plural foam components comprise an isocyanate.

9. The system of claim 1, further comprising a continuous stream of gas in the gas conduit.

10. The system of claim 1, wherein the nozzle comprises a cavity and wherein the flow diverter resides in the cavity and is able to move longitudinally and circumferentially while mixing the plural foam components.

11. The system of claim 10, wherein the flow diverter is of an irregular shape and resides loosely in the cavity.

12. A low-pressure system for mixing plural foam components and applying a directed stream of the mixed plural foam components to a surface, comprising:
 a hand held applicator configured for mixing plural foam components and directing a stream of the mixed plural foam components to a surface, wherein the hand held applicator comprises:
  a barrel;

a handle mounted to the barrel;
a mixing nozzle mounted to the barrel;
a sieve mounted to said barrel in alignment with the mixing nozzle;
a means for assisting with mixing of the plural foam components as the plural foam components move from the sieve through the nozzle to an exit spout of the nozzle, wherein the means for assisting with mixing can twist circumferentially;
a pair of fluid conduits extending through the barrel in alignment with the sieve and directed toward the mixing nozzle;
a fluid volume control trigger mounted to said barrel for simultaneously opening and closing the fluid conduits; and
a gas conduit extending toward the sieve configured for continuously providing gas to the sieve and mixing nozzle;
a volumetric metering device in fluidic communication with the hand held applicator through a heated hose; and
pre-heaters configured to heat plural foam components in the pair of fluid conduits, wherein the low-pressure system is configured to be operated at 300 pounds per square inch or less.

13. The system of claim 12, wherein the hand held applicator is configured for gas nucleated impingement mixing of the plural foam components from the pair of fluid conduits in the mixing nozzle upon actuation of the fluid volume trigger.

14. The system of claim 12 wherein the sieve of the hand held applicator has a first opening configured to receive gas from the gas conduit, a second opening configured to receive a first plural foam component from one conduit of the pair of fluid conduits, and a third opening configured to receive a second plural foam component from the second conduit of the pair of fluid conduits.

15. The system of claim 12, further comprising:
an air compressor.

16. The system of claim 12, further comprising:
a first non-pressurized container in fluidic communication with the volumetric metering device through a first conduit; and
a second non-pressurized container in fluidic communication with the volumetric metering device through a second conduit.

17. The system of claim 12, further comprising:
a first transfer pump configured to pump the first plural foam component from the first non-pressurized container though the first conduit to the volumetric metering device; and
a second transfer pump configured to pump the second plural foam component from the second non-pressurized container through the second conduit to the volumetric metering device.

18. The system of claim 12, wherein the plural foam components comprise one or more of plural component polyurethane, polyurethane foam, polyurethane adhesive, and polyurea formulations.

19. The system of claim 12, wherein the plural foam components comprise an isocyanate.

20. The system of claim 12, further comprising a continuous stream of gas in the gas conduit.

21. The system of claim 12, wherein means for mixing comprises a cavity and a flow diverter residing in the cavity and that is able to twist circumferentially while mixing the plural foam components.

22. The system of claim 21, wherein the flow diverter is of an irregular elongated shape and resides loosely in the cavity.

23. A low-pressure system for mixing plural foam components and applying a directed stream of the mixed plural foam components to a surface, comprising:
a hand held applicator configured for mixing plural foam components and directing a stream of the mixed plural foam components to a surface, wherein the hand held applicator comprises:
a barrel;
a handle mounted to the barrel;
a mixing nozzle mounted to the barrel;
a sieve mounted to said barrel in alignment with the mixing nozzle;
a flow diverter having a spiral and elongated diverter body positioned within the nozzle, the flow diverter designed to disrupt the flows of plural foam components that are directed toward an exit spout of the nozzle, the combination of the sieve and the flow diverter designed to create a churning pocket between them when the plural foam components flow out from the sieve toward the flow diverter in order to thereby assist with mixing the plural foam components;
a pair of fluid conduits extending through the barrel in alignment with the sieve and directed toward the mixing nozzle;
a fluid volume control trigger mounted to said barrel for simultaneously opening and closing the fluid conduits; and
a gas conduit extending toward the sieve configured for continuously providing gas to the sieve and mixing nozzle;
a volumetric metering device in fluidic communication with the hand held applicator through a heated hose;
pre-heaters configured to heat plural foam components in the pair of fluid conduits; and
plural foam components, wherein the low-pressure system is configured to be operated at 300 pounds per square inch or less.

* * * * *